US009338584B2

(12) United States Patent
Dempster et al.

(10) Patent No.: US 9,338,584 B2
(45) Date of Patent: May 10, 2016

(54) ELECTRONIC DATA SHARING DEVICE AND METHOD OF USE

(75) Inventors: Philip Edward Dempster, Cambridgeshire (GB); Balbir Singh Munday, Cambridgeshire (GB); Dominic Jan Ostrowski, Cambridgeshire (GB)

(73) Assignee: BLENDOLOGY LIMITED, Cambridgeshire (GB)

( * ) Notice: Subject to any disclaimer, the term of this patent is extended or adjusted under 35 U.S.C. 154(b) by 185 days.

(21) Appl. No.: 14/232,232

(22) PCT Filed: Jul. 9, 2012

(86) PCT No.: PCT/EP2012/063365
§ 371 (c)(1),
(2), (4) Date: Apr. 16, 2014

(87) PCT Pub. No.: WO2013/007675
PCT Pub. Date: Jan. 17, 2013

(65) Prior Publication Data
US 2014/0287688 A1    Sep. 25, 2014

Related U.S. Application Data

(60) Provisional application No. 61/506,105, filed on Jul. 10, 2011.

(51) Int. Cl.
*H04W 4/00* (2009.01)
*H04W 8/00* (2009.01)
(Continued)

(52) U.S. Cl.
CPC ........... *H04W 4/008* (2013.01); *H04L 67/1095* (2013.01); *H04L 67/18* (2013.01); *H04W 8/005* (2013.01); *H04W 12/02* (2013.01); *H04W 84/18* (2013.01)

(58) Field of Classification Search
CPC ...... H04L 67/18; H04W 12/02; H04W 4/008; H04W 84/18; H04W 8/005
See application file for complete search history.

(56) References Cited

U.S. PATENT DOCUMENTS

| 2004/0046656 A1* | 3/2004 | Schaefer | G08B 1/08 340/539.11 |
| 2004/0185785 A1* | 9/2004 | Mir et al. | 455/67.11 |

(Continued)

FOREIGN PATENT DOCUMENTS

WO     WO2007062488 A1    6/2007

OTHER PUBLICATIONS

Liu, Changlei et al. "Autonomous Proximity Awareness of Bluetooth Devices." IEEE International Conference on Communications in Seoul, Korea, May 16, 2005, v.2, pp. 934-938.

(Continued)

*Primary Examiner* — David Bilodeau
(74) *Attorney, Agent, or Firm* — Huffman Law Group, PC

(57) ABSTRACT

An electronic data sharing device for sharing user related information with users of other functionally similar electronic data sharing devices, the electronic data sharing device configured to: generate a temporary, non-unique, identification tag to identify the electronic data sharing device, transmit from the electronic data sharing device the generated identification tag via a wireless medium, receive at the electronic data sharing device a further identification tag generated by a further electronic data sharing device, and generate an alert on the electronic data sharing device when the transmission and reception of the identification tags coincide to indicate that the further electronic data sharing device is in the vicinity.

14 Claims, 9 Drawing Sheets

(51) Int. Cl.
*H04W 12/02* (2009.01)
*H04L 29/08* (2006.01)
*H04W 84/18* (2009.01)

(56) References Cited

U.S. PATENT DOCUMENTS

| | | | |
|---|---|---|---|
| 2006/0050669 A1* | 3/2006 | Kaikuranta | H04W 4/008 370/338 |
| 2006/0142034 A1* | 6/2006 | Wentink | H04W 8/005 455/515 |
| 2006/0223556 A1 | 10/2006 | Xu et al. | |
| 2009/0214039 A1 | 8/2009 | Chen et al. | |
| 2010/0199358 A1* | 8/2010 | Yao | H04L 67/306 726/27 |
| 2014/0222504 A1* | 8/2014 | Mackenzie | G06Q 10/10 705/7.29 |

OTHER PUBLICATIONS

Emily "Minglestick: The Electronic Business Card" Jan. 6, 2010. Retrieved from the Internet: http://busy-mommy.com/2010/01/minglesticks-the-electronic-business-card.html. pp. 1.

Evans, Sally "Connect with Mingle Stick" Sep. 30, 2009. Retrieved from the Internet: htpp://www.lighthouse-environmental-products.com/mingle-stick.html. The whole document.

MINGLE360: "MingleStick Sponsorship" Sep. 28, 2010. Retrieved from the Internet: http://www.mingle360.com/pdf/mingle360_sponsor_brochure.pdf The Whole document.

* cited by examiner

SERVER

| | GENERATOR | RECEIVER |
|---|---|---|
| TAG A(j) | DEVICE A | |
| TAG A(k) | DEVICE A | DEVICE B |
| TAG B(n) | DEVICE B | |
| TAG B(o) | DEVICE B | DEVICE A |
| TAG B(p) | DEVICE B | |

FIGURE 7

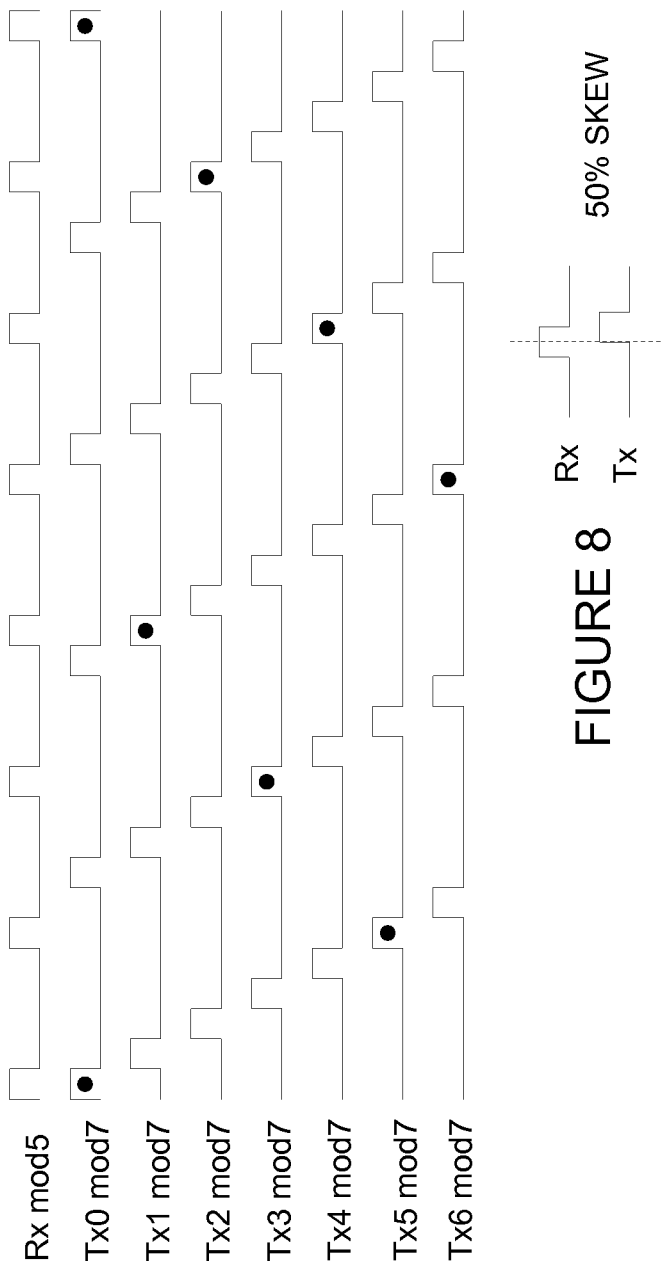

ELECTRONIC DATA SHARING DEVICE AND METHOD OF USE

FIELD OF THE INVENTION

The present invention relates to an electronic data sharing device and method of use. In particular, the present invention relates to an electronic data sharing device and method that enables tags to be exchanged with other electronic data sharing devices to generate an alert.

BACKGROUND

Personal electronic devices exist that are designed primarily for the purpose of storing a user's own contact details and exchanging these contact details with other users of similar devices. The process is likened to exchanging business cards.

Typically these devices are battery-powered, very compact and hand-held. They usually have a very minimal user interface consisting of just a button, an LED and a USB port for connecting the device to a personal computer.

To exchange contact details, two device users, each with one of these devices, each bring their own device into proximity or alignment with the other device. Then upon pressing their respective buttons on their device, each user's contact information is copied to the other device.

The information exchanged is usually not viewed on the device itself, but the device is later plugged into a USB port of a personal computer, and the information viewed on this personal computer.

Usually this service is provided via a dedicated web server, created for the users of a particular manufacturer's device. When the device is plugged into a personal computer, the information from each device is moved to the web server, where it is stored and presented back to the user, through a web page on the personal computer.

Additionally, some of these web servers may collect and share additional contact information such as phone numbers or links to a user's social networking profile.

The devices generally exchange telephone numbers, email addresses, personal information for online social-networking websites, or other forms of contact information, or at least provide the means to obtain this information indirectly.

However, a problem exists in that known devices have several security flaws and usage limitations caused by the mechanisms by which they exchange data, the nature of the data exchanged, and the methods of uploading data.

For example, these known devices typically exchange data between a sending device and a receiving device and later transmit both the data received as well as the data sent to a server, via the user's computer. By not providing a capability to prevent third parties from accessing this shared data, for example by capturing the data surreptitiously during the data exchange, or through malware on the user's computer, it becomes quite clear that the proposed relationship between the two parties is potentially accessible and compromised.

Further, it is typically a requirement that these types of devices require users of the devices to enter their contact details on the device prior to use, or that some further configuration of the device is necessary. This may be problematic if the user's contact details have changed between the data entry steps and the exchange of contact information resulting in incorrect contact details being exchanged, or simply be inconvenient in the social context in which the device is used.

Also, the exchange of contact details between these types of devices is typically transferred to the servers in an unencrypted format enabling third parties to gain access to the data without permission. This also means that, if the information is sent to or diverted to an incorrect server, the data may be compromised. Other vulnerabilities to malicious usage may include the manufacture and sale of compatible devices by unauthorised third parties, computer-based malware able to delete or alter genuine contacts or introduce new non-genuine contacts, and web server vulnerabilities to distributed-denial-of-service and other attacks through being flooded with inauthentic data.

Further, users of these types of devices are not able to determine, without intervention by the user, if a person they are conversing with, mingling with or who is in the same general vicinity as themselves has a compatible device for sharing contact information. Further, there are security and privacy implications, and power-consumption constraints, to enabling automatic detection.

Typically, devices that are designed for the purpose of storing the user's own contact details and exchanging these details with other users of similar devices lack any facility to detect nearby devices.

Existing devices typically either use electromagnetic coupling employing induction coils and require the user of one device to hold it in close proximity and alignment to another user's device, or they use infra-red or optical beams and require the user of one device to deliberately aim that device at another device, whilst the second user aims their device at the first user's device. No other communication can occur between these devices.

This inability to detect nearby devices and alert the users that there may be a person nearby with a similar device is seen as a limitation to usefulness of the device due to the user's lack of awareness that another user, with which they might want to exchange contact details, also has such a device in their possession.

Further, users are limited in gaining access to any data exchanged until such time as they have access to a suitable internet-connected computer. This inability to synchronise data held within the device without such access is seen as a limitation to the user being able to make immediate use of any data exchanged.

Further, users are limited in that identical personal data is shared in every data exchange, without an option to selectively share certain information with some users and not with others. This inability for the user to select which information is shared with which party is seen as a limitation of current devices.

Further, users are limited in that personal information must be recorded prior to use of the device. This inability to provide flexibility regarding the registration of personal information is seen as a limitation regarding the organisation of events where the device will be used.

Further, devices are limited to responding to user-initiated behaviour only.

An object of the present invention is to provide a device or method of using such a device that enables users of the device to determine that other similar devices are in the vicinity.

An object of the present invention is to provide a device or method of using such a device that doesn't require a user to supply user related information or carry out any other pre-configuration prior to using the device.

Each object is to be read disjunctively with the object of at least providing the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

According to one aspect, the present invention provides an electronic data sharing device for sharing user related information with users of other functionally similar electronic data sharing devices, the electronic data sharing device configured to: generate a temporary, non-unique, identification tag to identify the electronic data sharing device, transmit from the electronic data sharing device the generated identification tag via a wireless medium, receive at the electronic data sharing device a further identification tag generated by a further electronic data sharing device, and generate an alert on the electronic data sharing device when the transmission and reception of the identification tags coincide to indicate that the further electronic data sharing device is in the vicinity.

According to a further aspect, the present invention provides a method of data sharing using an electronic data sharing device for sharing user related information with users of other functionally similar electronic data sharing devices, the method comprising the steps of: generating a temporary, non-unique, identification tag to identify the electronic data sharing device, transmitting from the electronic data sharing device the generated identification tag via a wireless medium, receiving at the electronic data sharing device a further identification tag generated by a further electronic data sharing device, and generating an alert on the electronic data sharing device when the transmission and reception of the identification tags coincide to indicate that the further electronic data sharing device is in the vicinity.

BRIEF DESCRIPTION OF THE DRAWINGS

Embodiments of the present invention will now be described, by way of example only, with reference to the accompanying drawings, in which:

FIG. 7 shows data stored at a server according to an embodiment of the present invention;

FIG. 8 shows a transceiver protocol according to an embodiment of the present invention;

DETAILED DESCRIPTION OF THE INVENTION

Figure 1:
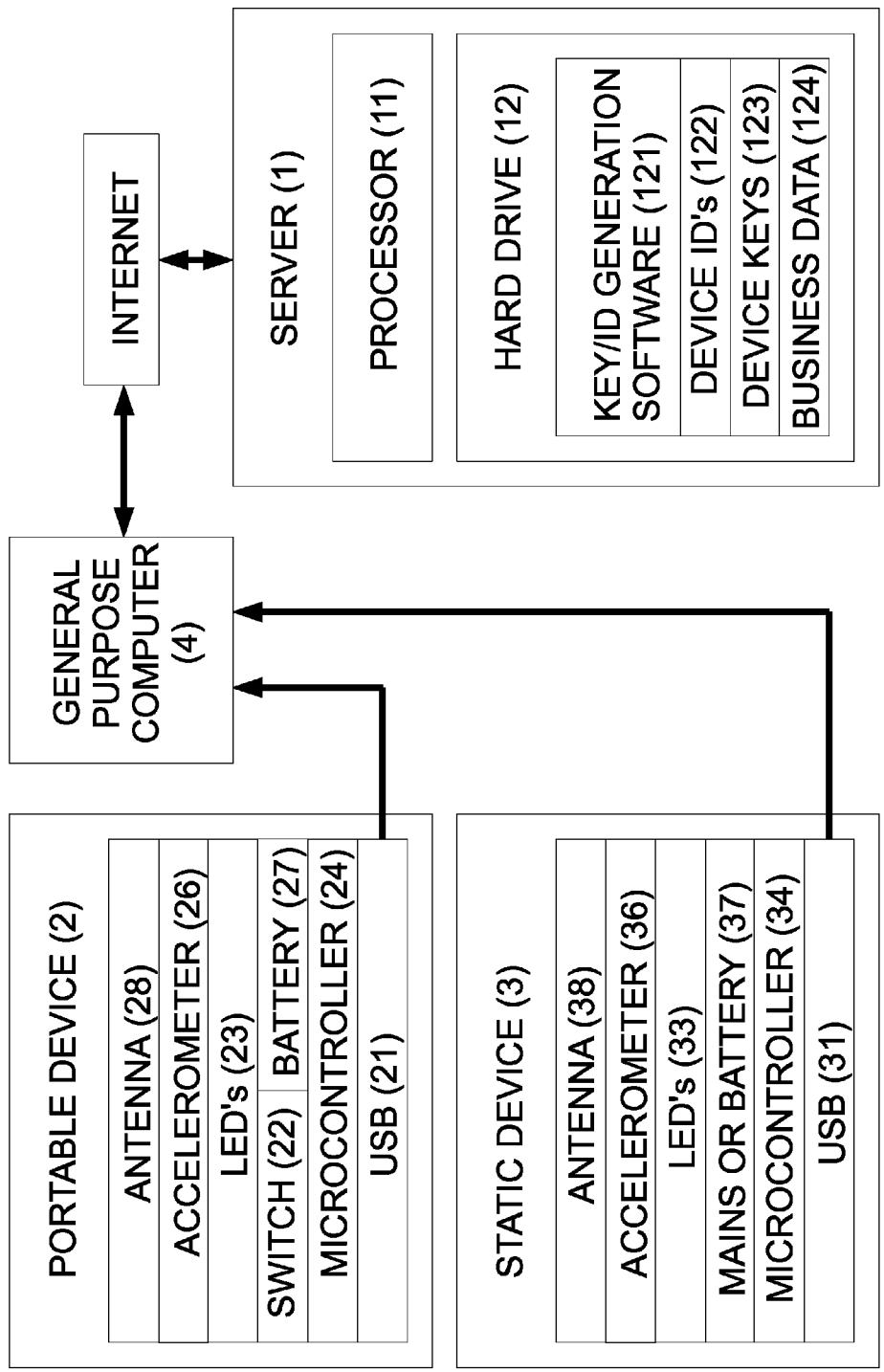
FIG. 1 shows a schematic representation of various components according to an embodiment of the present invention.

It will be understood that the system herein described includes one or more elements that are arranged to perform the various functions and methods. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

First Embodiment

According to this first embodiment an electronic data sharing device is described. Users of the device are able to share user related information with other users who have a similar device.

The user related information may be contact information, such as name, address, e-mail, telephone, web address, social network account address etc. Further, the user related information may be other user related information such as age, sex, nationality, preferences, likes, dislikes, marital status, job status, job position, company details, employment history etc.

The electronic data sharing device according to this embodiment is a personal portable device that each user carries around on their person.

As an alternative, the electronic data sharing device may be a device not associated with any particular user. For example, the device may be accessible to the public providing a public service (i.e. not being used as a personal device), to enable users having a personal portable device to share user related information with the publically accessible device. For example, the publically accessible device may be associated with a particular company, business, organisation or other entity, and may be used by that entity to share entity related information with the users, while in return receiving the user's related information. The device may be a static nonmoving device, or alternatively may be a mobile device that moves around by any suitable means. For example, these non-personal devices may be attached to vehicles, mobile displays or person(s) acting as a mobile display.

As another alternative this non-personal device may be designed to enable a user to express a preference, either anonymously or by including the identity of the user. For example, a user may use a personal device to communicate with a sign, poster or other display to indicate "like", "dislike", "yes" or "no", by communicating with one or more non-personal devices embedded in or adjacent to the display.

FIG. 1 shows a system diagram of how the electronic data sharing devices (non-personal and personal portable devices) may be used in conjunction with a server.

The server 1 includes a processor 11 and a memory in the form of a hard drive 12. The hard drive 12 contains software 121 by which the processor generates either a pre-shared key, or a public/private key pair according to well known methods, for example RSA.

Where a public/private key pair is used, the private part of the key always remains on the server. The public part of the key is included in the portable and/or static electronic data sharing devices.

Where a pre-shared key is used, a key is generated for each device, along with an associated public unique identification. The server memory may also contain business related data 124 associated with the entities involved with particular electronic data sharing devices.

Each portable electronic data sharing device 2 has a USB type-A male connector 21, a momentary action push-switch, button or touch sensor 22, up to 8 LED's of any type 23, a microcontroller 24, an accelerometer 26, a battery 27 and an inverted "F" antenna 28.

Each non-personal electronic data sharing device 3 is essentially the same as the portable device 2 but does not require the use of a switch or touch-sensor. Component parts of the non-personal device 3 are designated with reference numerals similar to those of the portable device 2 but with the prefix digit 3.

It is assumed that, if other synchronisation mechanisms are not available as described in alternative embodiments, a general purpose computer such as that indicated at 4 is available to each user.

The microcontroller in the electronic data sharing device and processor in the server are arranged to perform the steps of a program stored as program instructions within a memory device. The program instructions enable the various methods of performing the invention as described herein to be performed. The program instructions may be developed or implemented using any suitable software programming language and toolkit, such as, for example, a C-based language and compiler.

A computer readable medium may be used for tangibly storing the program instructions. The computer readable medium may be, for example, solid state memory, magnetic tape, a compact disc (CD-ROM or CD-R/W), memory card, flash memory, optical disc, magnetic disc or any other suitable computer readable medium.

The personal portable device version consists of a package that is approximately 32 mm by 11 mm by 4 mm in size and weighing approximately 20 grams. At one end it has a male type-A USB connector. The package resembles, in weight and dimensions, a USB flash drive. It will be understood that, as an alternative, the device may take on other dimensions, sizes and/or weight. Further, the USB connection may be replaced or omitted or used in conjunction with an alternative computing interface, whether wired or wireless.

An outer casing may be slipped over the package for protective and styling purposes, and to conceal the USB connector. The casing may be made, for example, from a fabric or plastic material to show an entity's logo associated with the sponsorship of the devices.

Also visible to the user may be a single button or touch-sensor and up to 8 LED's. The button or touch-sensor according to this embodiment may be used by the user to indicate that they wish to share user related information with a further device (whether non-personal device or a personal portable device). The LED's according to this embodiment are in several different colours to indicate the status of the device. It will be understood that the device may have any number of LEDs or no LEDs at all, and that any LEDs may have any desired colouring.

Figure 2A:
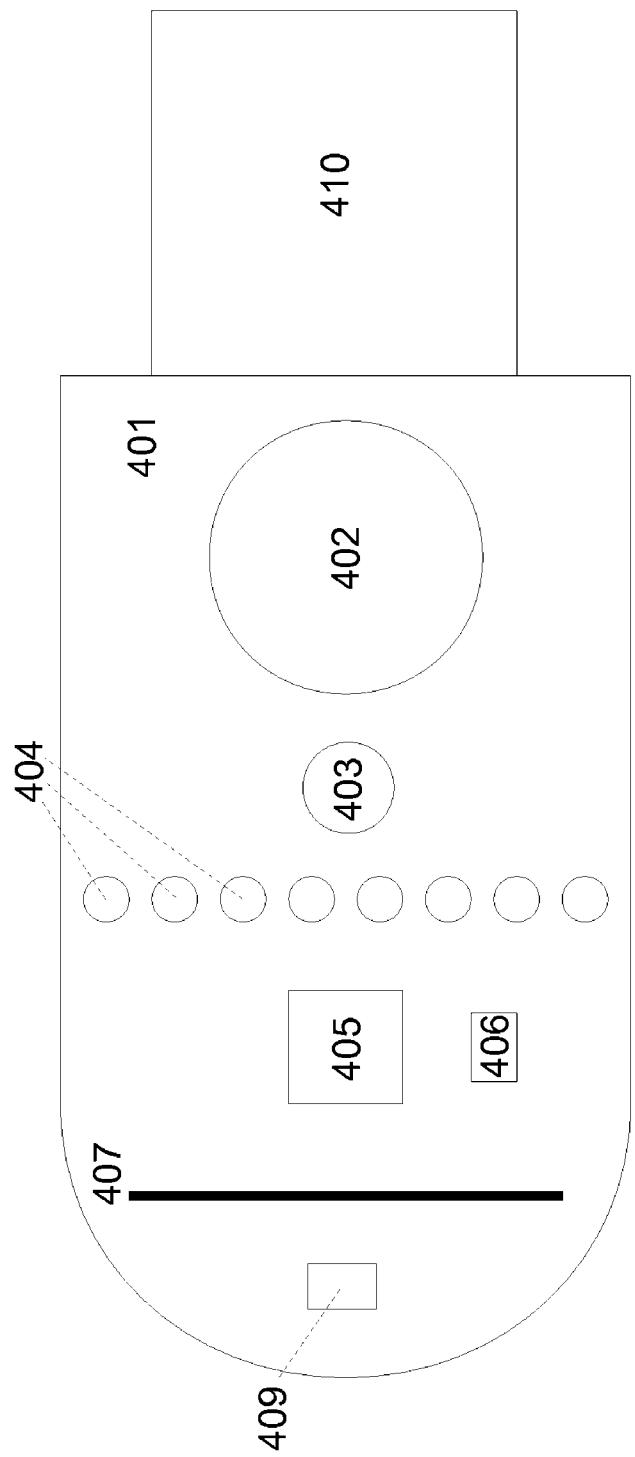
FIG. 2A shows a layout of components in a device according to an embodiment of the present invention.

Referring to FIG. 2A, the electronic data sharing device includes a printed circuit board 401, a 3V lithium button-cell battery 402, a user-operated momentary action push-switch or touch-sensor 403, 8 LED's 404, an integrated radio (e.g. 2.4 GHz and with worldwide compliance to all relevant legislation regarding radio emissions) and micro-controller component (including flash memory, AES encryption hardware, and USB interface) 405, a crystal oscillator 406, an inverted-F type antenna 407, an accelerometer 409, a type A male USB connector 410, and firmware in the flash memory of the micro-controller.

Figure 2B:
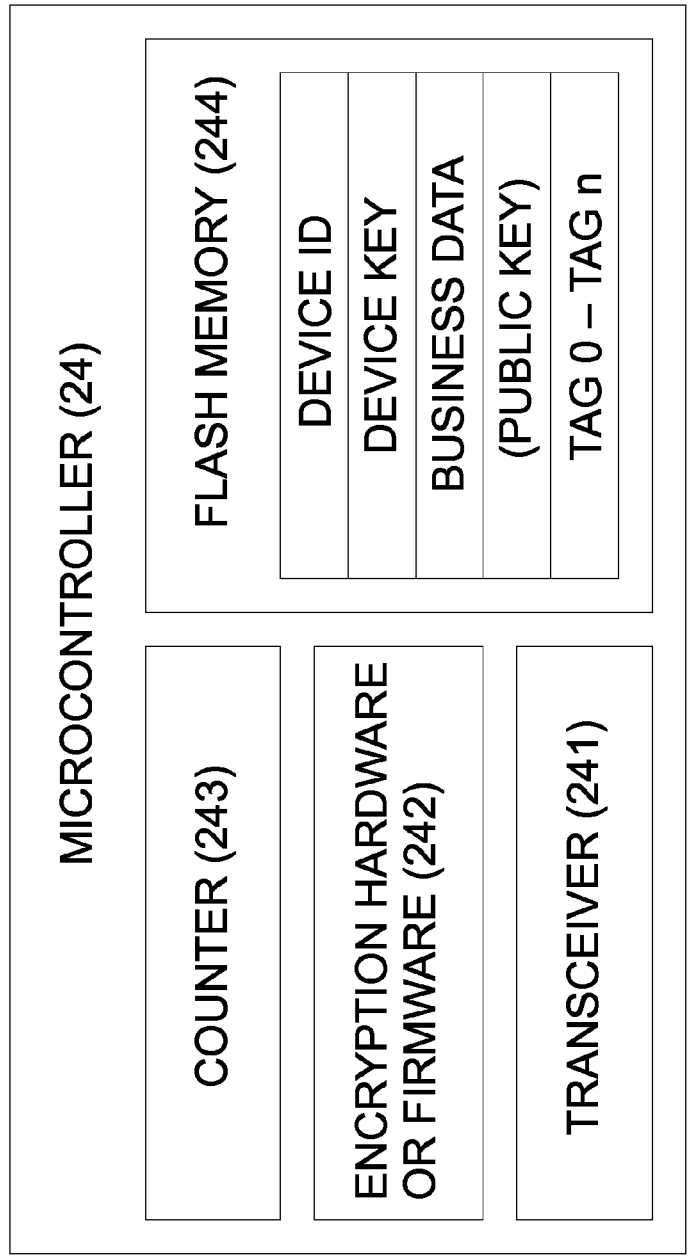
FIG. 2B shows a schematic representation of components in a device according to an embodiment of the present invention.

FIG. 2B shows an alternative schematic view where details of the portable electronic data sharing device in schematic form. Referring to FIG. 2B, the microcontroller 24, which in this example is a Nordic nRF24LU1+ processor incorporates a radio transceiver 241, encryption hardware 242, a counter 243 and a flash memory 244. The flash memory may include at various times one or more of device id, device key and an encrypted device key. It will be understood that the device key and pre-shared key are any suitable form of electronic key.

Figure 3:
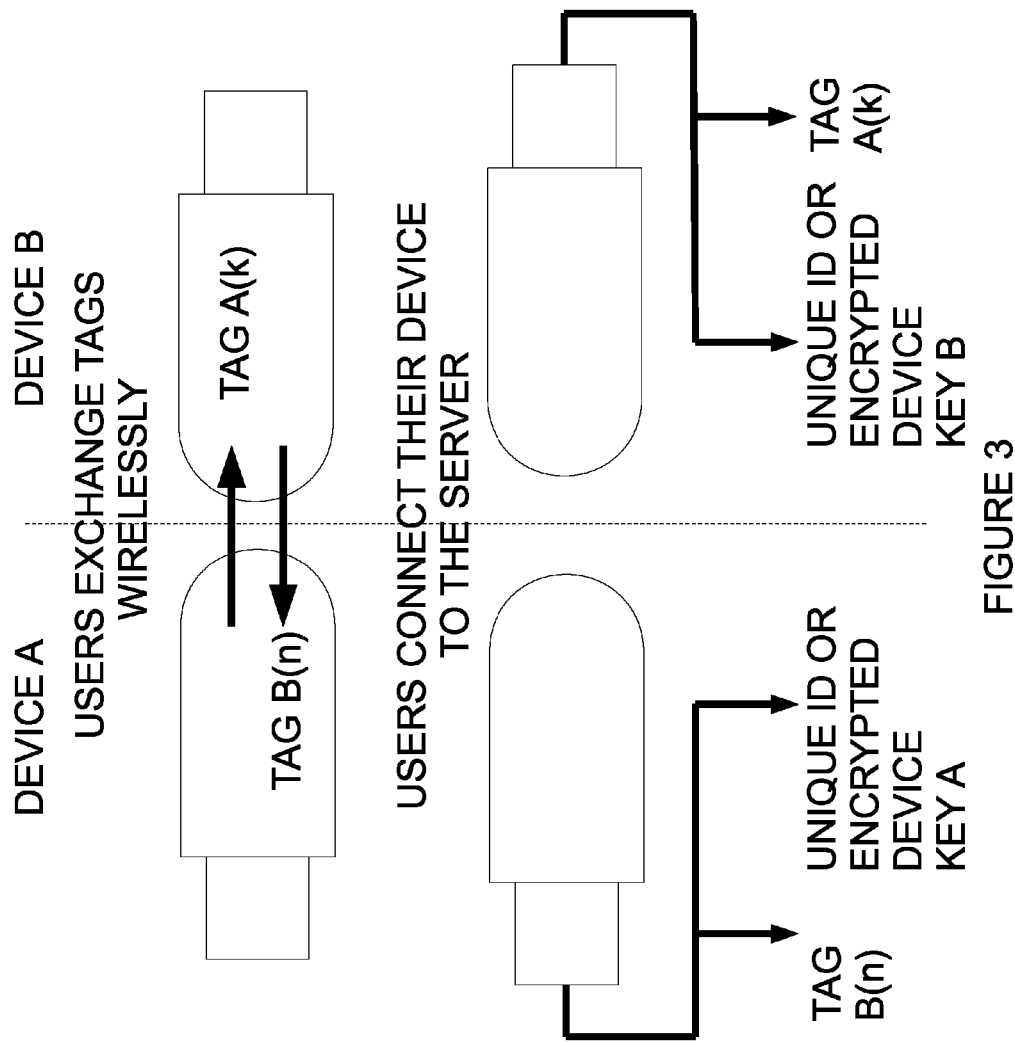
FIG. 3 shows a representation of device interaction according to an embodiment of the present invention.

According to a basic operation of the device as depicted in FIG. 3, two people each with their own device (Device A and Device B) first press the button or touch-sensor on their respective devices to indicate their intention to exchange data. This initiates the data exchange request sequence by first waking the electronic data sharing device up (if not already awake) and generating the required electronic tags (if not already generated) using electronic keys ready for exchange.

According to this embodiment, users move their respective devices into contact with each other and data is exchanged between the devices. The successful outcome of this is that both devices record the data exchange event, as will be explained in more detail below.

All devices (whether non-personal devices or personal portable devices) contain similar electronic components, with no requirement for devices to be differentiated into masters and slaves, as the firmware uses a suitable algorithm to ensure that any device can communicate with any other.

The non-personal device version of the electronic data sharing device is intended for unattended use. It is possible for the user of a personal portable (or handheld) device to approach the non-personal device to enable data to be exchanged with it. The non-personal device may include mains power or battery power. Further, it may have a connection to a personal computer, tablet device or other computing device. The PC, tablet device or other computing device may have a connection to the internet, or it may not. Custom software may be placed on the personal computer, tablet device or other computing device to enhance the user's experience of interacting with the non-personal device, to synchronise data with a server, or for any other suitable purposes.

For example, the non-personal device may be placed at shop premises, next to stands at trade shows or any other prominent position where a user may wish to interact with an entity.

According to one use, the electronic device, whether in the form of a personal portable device or non-personal device, may be provided by an issuing entity to various organisations in order to encourage data sharing. For reasons of price or convenience, many users will accept a data sharing device that is linked with a business, marketing company or similar organisation, seeking business, marketing or similar information.

Each device may have an association with a business, marketing company or similar organisation, or other organisations of their choosing, either permanently embedded in the device, embedded but removable, or added during the course of use of the device, or later by the use of associated software systems.

Additionally, the design of the device and associated software systems may allow the business, marketing company or similar organisation to access the necessary information to contact some or all of the users of similar devices that the user has connected to, with the device, in real-life.

It will be understood that this information may then be used to construct statistical information, individual or group profiles, time-lines, maps, social graphs, other graphs, or other visual or similar information or other views of such information useful for business, marketing or similar purposes that may be of value to them.

Operation of the proposed device is linked with a business model that wholly or partly subsidises the cost of the device to the end user. It is proposed that the device be used in marketing campaigns, brand and product promotions and similar activities by businesses. Typically it would be provided free of charge to each visitor to an event such as a concert, nightclub, bar, reception, exhibition, sporting event, conference or other place where visitors congregate and mix socially.

According to this model, if a sufficient number of devices are provided free of charge, the necessary critical mass of users will be achieved to ensure rapid take-up and usage. Where this is coupled with sponsorship of an event, little or no reluctance is expected on the part of users to accept the business data-collection role of the device.

Other distribution models include subsidized retail sales, as a promotional item given to customers, suppliers or business contacts in relation to other commercial activity, or including the device in with other product sales.

Basic Operation

The following description describes how the electronic data sharing device operates.

The electronic data sharing device is configured to enable users to share user related information by exchanging one or more references to that information.

Each reference will be in the form of a tag that is used to identify a device-to-device data-exchange with one or more functionally similar devices. This exchange of tags provides a record that each user wishes to exchange their user related information. The actual exchange of user related information is performed at a later time by another means, as will be explained in more detail below.

The tag may be a tag consisting of numbers, letters, symbols or any combination thereof that is able to be reproduced by an electronic device.

Tags will be generated on the device by a tag generation module (which may form part of the processor, for example) and be sufficiently-large to be considered unique or at least near-unique.

The tags may be: cryptographic hashes; block ciphers; random numbers, alpha-numerics or symbols; cryptographically-secure pseudo-random numbers, alpha-numerics or symbols; pseudo-random numbers, alpha-numerics or symbols; or other numbers, alpha-numerics or symbols with similar mathematical properties.

Methods of generating these tags include either or both hardware or software systems capable of performing these mathematical operations.

If a sufficiently large range of numerical values are used for these tags, it will be understood that is becomes extremely unlikely that any two or more tags would match unintentionally, thus providing a substantially unique tag for each device.

The device generates the tag locally on the device in preparation for the initiation of a data exchange routine, and so the near-unique tag enables such devices to be used with no pre-registration by the user. Further, there is no requirement for the device to contain any other information apart from the unique tag.

In normal use, these tags are shared or exchanged between two or more users of such devices desiring to exchange user related information. The tags are exchanged by a communication module configured within the device to wirelessly exchange the generated tags between two devices using 2.4 GHz.

Each device generates its own tag and exchanges it with a tag that has been generated by another device. Each device then stores all the received tags in memory located on the device.

The tags are then transferred to the server by any suitable electronic communication means. There may be several different ways of achieving this for the user depending on the availability of equipment, as explained in more detail below.

For example, the electronic data sharing devices may be connected to a computer server at a later time via any suitable electronic communication method. For example, the user may connect the electronic data sharing device to an internet-connected personal computing device (such as a laptop, notebook, tablet or PC) and use that computing device to upload the data on the electronic data sharing device initially to the computing device, which then transfers it to the server via the Internet. The data may then be accessed using an Internet based service.

Located on the server is software or data to enable a user registration sequence to initiate, or for an existing user registration to be re-used. Each user enters their user related information onto that server, where it will be stored, along with tags uploaded from the electronic data sharing device to the server. Alternatively user interaction with the data synchronised on the server may happen via a smartphone application, for example.

The server is configured to match up the tags presented to it for the purposes of exchanging the user related information using any suitable matching algorithm. Where the server determines that a match is found, as explained in more detail below, user related information for each user who agreed to exchange tags may be presented to the other user with whom they exchanged the tag with. It will be understood that a user of the device may share one or more tags with other users.

Therefore, tags may be exchanged to enable users to subsequently access user related information without requiring, before use of the device, any user related configuration or data entry associated with the device or service.

Security

The following description describes how the electronic data sharing device may operate in a mode able to provide a comprehensive solution to possible security vulnerabilities.

The secure mode may be permanently enabled. Alternatively, the secure mode may be enabled in response to a potential threat. When the secure mode is generally enabled, some or all of the specific features may be disabled. For example, for engineering development purposes, or in order to investigate operational problems, it may be considered useful to temporarily disable encryption. Alternatively, for export to certain legal jurisdictions it may be necessary to permanently disable encryption.

When considering a subsidized electronic data sharing device, certain extra safeguards may be required to protect this subsidy. For example, these safeguards may include that a) only authorised devices will be accepted by the authorised server, b) authorised devices will not work with another server, c) authorised devices cannot be used for an unauthorised purpose, d) data in the authorised devices cannot be used for an unauthorised purpose, and e) it is not possible to generate data that would appear genuine to the authorised server.

All five of these requirements can be met by the use of encryption. The herein described system ensures that each device uses a unique or near-unique encryption and that this encryption is known only to the server and the device.

According to this embodiment, the security model used is either a pre-shared key, or a public-private key-pair, which is used to encrypt a symmetrical device key (session key). However, it will be understood that other suitable alternative encryption techniques may be used.

The security model protects the device issuing entity's (e.g. a sponsor) investment in the device. Additionally, it is important that a device cannot be used with a server other than the one specified by the issuing entity, and that user references originating from data-exchanges are useless unless passed to the intended server.

The pre-shared key or public-private key pairs are generated on a remote server.

According to a first example, the pre-shared key is unique to each device and known to both device and server, The pre-shared key is associated with a unique device identification and this identification is used by the device to identify itself to the server.

According to a second example, the private key is retained at the server, and the public key is included with the firmware of every device. The public key is subsequently used to encrypt the device key on the device in order to transfer the device key from the device to the server.

According to the second example, an RSA public-private key-pair is generated, with the private key being stored on the server and never leaving the server. This is only done once, and many devices may share the same public key. It will be understood that there may be further provisions in the system for finer granularity of the public key encryption scheme.

Figure 4:
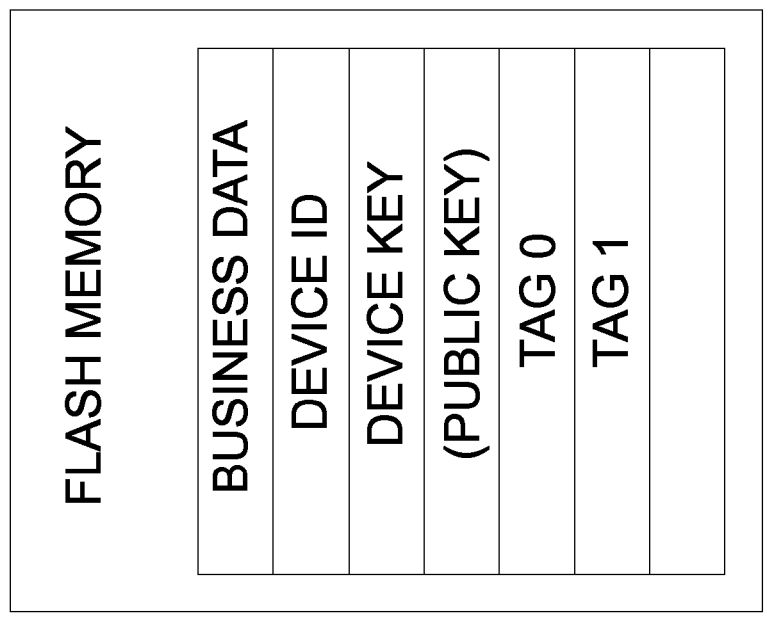
FIG. 4 shows a flash memory according to an embodiment of the present invention.

Along with the firmware, either the pre-shared key or 2048 bit RSA public key is stored in the device's flash memory during manufacture, as shown in FIG. 4. That is, the flash memory includes business related data associated with the entity issuing the devices, a public key (RSA), the device key (used as a session key), a public-key encrypted copy of the device key and a number of tags depending on how many tag exchanges have occurred. Alternatively a pre-shared key and a unique device identification are stored instead of the public key, device key (encrypted and unencrypted).

All data transfers are from device to device, or device to server. The system does not allow data transfers from the server to any device and so there is no requirement for the device to hold a private key corresponding to a public key on the server.

Figure 5:
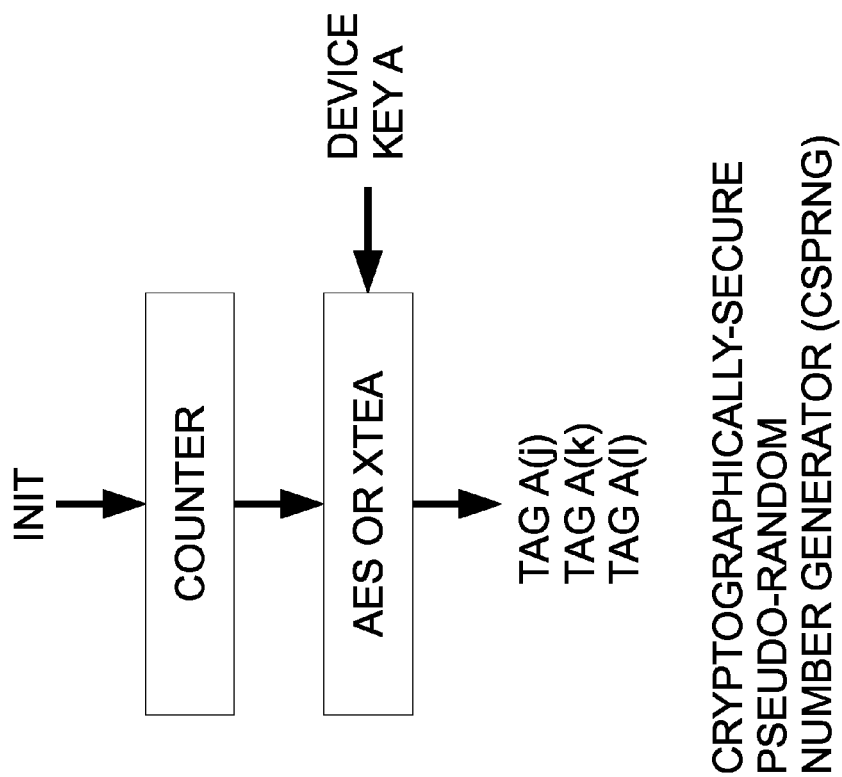
FIG. 5 shows an AES encryption process according to an embodiment of the present invention.

The device may also contain a 128 bit AES hardware encryption block. This block is configured in firmware to function as a cryptographically-secure pseudo-random number generator (CSPRNG) (see FIG. 5), by operating it in counter mode (CTR). Alternatively this may be implemented in software and an alternative algorithm used such as XTEA.

At first boot, the counter is initialized, and the device key, used as an XTEA or 128 bit AES encryption key, if not supplied by the server, is prepared. The lifetime of the device key may be the lifetime of the device. This lifetime may be precisely controlled from within the firmware. Therefore the device on start-up generates the device key if necessary, but never allows this key to become exposed outside the device.

The device key may be generated using any suitable source of entropy that is available to the device. For example, the device key may be generated using one or more parameter including date, time, time period, location, sensory input, electrical noise, analogue source or any other suitable source of entropy or combination thereof. For example, the device key may be generated from parameters generated by an internal source, or by an external source, such as a server.

Alternatively, each device may have a device key loaded into the memory of the device at manufacture.

If necessary, in the device's firmware, the RSA public-key encryption algorithm prepares an encrypted copy of the device key.

According to one embodiment, the device is configured to use the device key in the cryptographically-secure pseudo-random numbers generator (CSPRNG) in order to generate the tag. Each device has its own generated tag which is then exchanged. Each 128 bit tag is generated by the CSPRNG.

That is, a first device generates its tag and sends this generated tag to a recipient device. Likewise, the recipient device generates its tag and sends this to the first device.

Figure 6:
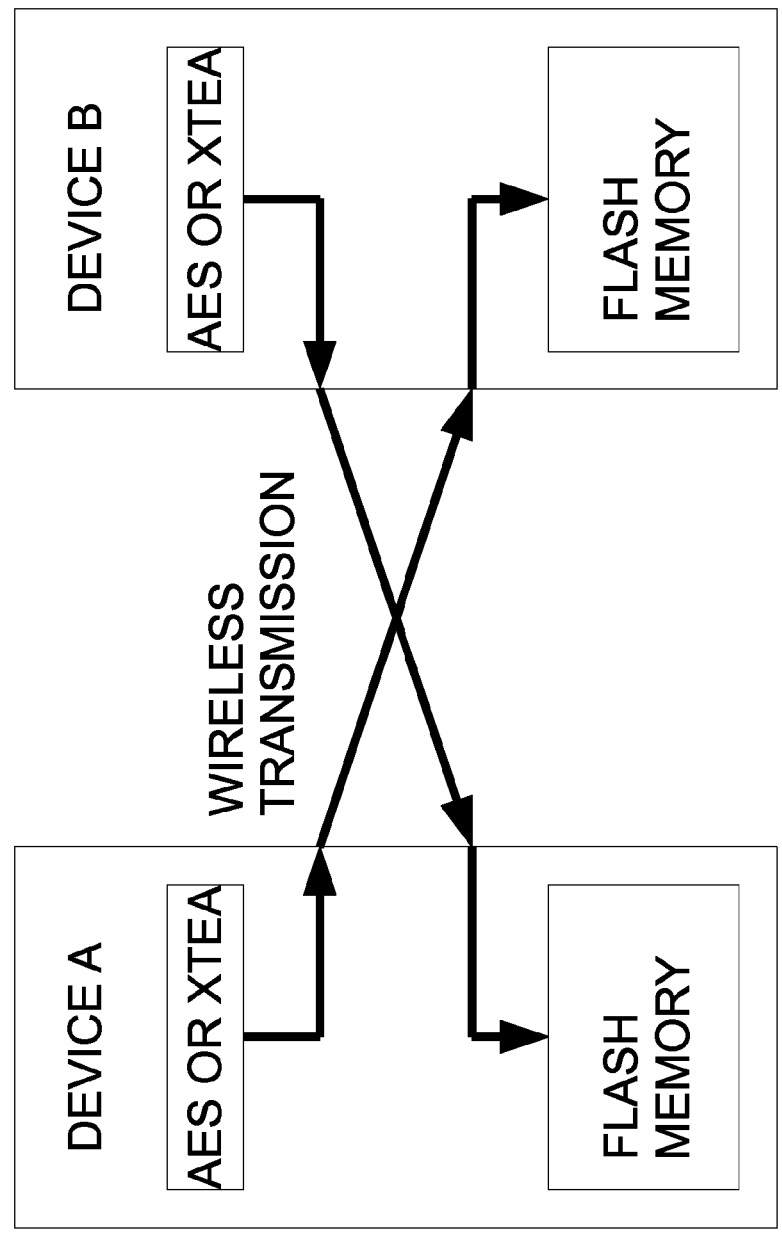
FIG. 6 shows a data sharing process according to an embodiment of the present invention.

After each tag is generated and sent, the counter in the CSPRNG is incremented, but the generated tag is discarded. The received tag is committed to flash memory (see FIG. 6). Usage continues in this fashion for as long as the user desires, or until the flash memory is full (e.g. 1024 tags), or until limits set in the firmware are reached.

According to this embodiment, neither device records the tag that it generates. That is, locally generated tags are not stored. Only tags that are received from other devices are stored.

It will be understood that, as an alternative, each device may store its own generated tags. For example, this may be required legally in certain jurisdictions, or alternatively the stored tags may provide an engineer with tools to enable the debugging of the device.

The users of the device may then repeat this process to enable the device to perform multiple user-initiated data-exchanges.

After the electronic data sharing device has been used to exchange one or more tags, it may be connected to the server via an internet connected computing device. The electronic data sharing device transfers the unique device identification or public-key-encrypted version of the device key to the server by uploading it, via the computing device, along with all the received tags.

The server uses either the received unique device identification to find its copy of the pre-shared key, or the private key to decrypt the received public-key-encrypted version of the device key. It also inspects the transmitted tag tally or number of tags received by the device and determines the total number of user-initiated data-exchanges.

The server then regenerates the total number of tags sent by the device by running an identical CSPRNG with a key identical to the one used on the device. As the server has the same algorithm and same key, the tags that were generated by the device are regenerated at the server, without requiring each device to send both sent and generated tags to the server. The server now has a complete set of tags both received and sent by this device (see FIG. 7).

The regenerated tags are entered into a database and associated with this device (and its associated user) as the sender. Alternatively, where these tags pre-exist in the database, the association with the device and/or user is added.

The received tags are also entered into the database and associated with this device (and its associated user) as the receiver. Alternatively, where these tags pre-exist in the database, the association with the device and/or user is added.

The entries associated with this device as sender are then scanned by the server to determine matching associations with a receiver. Where matches occur, both users of the respective devices are notified by the server in order for them to view their respective user related information.

The very large numerical range of tags ensures that attempts at third party tag generation are extremely unlikely to be successful.

An additional consequence of the proposed security model is the absolute privacy of users, and examination of the data in these devices will be of no value.

It will be understood that certain restrictions of the device may be incorporated into the firmware. For example, these restrictions may include limiting the number of data-exchanges, a time limit after which data-exchanges are disabled, and a time limit after which the device is wholly disabled.

The time of each data-exchange may also be recorded in the flash memory, in terms of elapsed time since boot. The device also incorporates flash memory space allocated to the sponsor of the device. The purpose of this memory space is not fixed, and may be used for multiple purposes according to the sponsor's need.

All such extra data may be encrypted with the device key before the data is uploaded from the device to the server.

The device has 2 basic modes of operation, a first when it is physically connected to a computer by the device's USB port and powered through that port, and a second when it is unconnected and powered by the device's own internal battery.

When connected to a computer, the device functions as a mass storage device and radio communications are usually disabled. The connected mode is similar in implementation to that widely used in USB flash drives, making the data storage area of the flash memory accessible to the host computer. The device restricts the ability of the host computer to write to or erase the flash memory.

Devices may initially be supplied with the battery disabled by a pull-out tab blocking one of the battery contacts. After this tab has been removed the initialisation code in the firmware is run. Part of this initialisation may prepare and store the device key as described above. This will bring the device to a state where it is ready to operate and, in the absence of any triggering events, it will then enter a power saving state.

A data exchange initiation device is used to detect the initiation of a data exchange request. According to this embodiment, the data exchange initiation device includes a button or touch sensor, as well as an accelerometer. Through a combination of activation of these components, the electronic data sharing device is activated, a tag may be generated (if not already generated) upon a tag generation module receiving instructions from the data exchange initiation device, and a signal may be sent to a communications device to transfer the tag to another functionally similar device, It will be understood that the generation of the tag may be carried out at any point prior to the exchange of tags, but preferably before the user activates the accelerometer. It is advantageous to have a tag ready for exchange prior to the accelerometer being activated to assist in the efficient exchange of tags within a defined time period.

Upon the exchange of tags, the tag just used is marked as used in the memory and a new tag is generated in readiness for a further exchange.

According to a particular example, upon the electronic data sharing device first being booted up (e.g. by activation of the button or touch sensor), a tag is generated and stored in the device's memory in preparation for the initiation of a data exchange routine. If no routine is instigated by the user, the electronic data sharing device returns to a sleep mode.

To wake the electronic data sharing device from the sleep mode, the user may press the button (or touch sensor). For example, if the user decides to share their user information with another user of a functionally similar device.

Therefore, the device will wake from its power saving state for a defined time period. If during this time period the accelerometer is activated by for instance tapping one device against another, the firmware within the electronic data sharing device will detect this event (via a signal generated by the accelerometer) and respond by enabling the device's communication module (including a transmitter and receiver) to transmit the generated tag and, according to some embodiments, receive a corresponding tag from the functionally similar device.

The device randomly selects to transmit or waits to receive a communications packet. Repeated attempts at communication are made at fixed intervals, each with a random assignment to transmit or receive mode. Therefore, the device repeatedly operates in either transmit or receive mode within a defined period of time in order to attempt communication with a similar device. This action may be indicated to the user by the activation of an LED. Further, the electronic data sharing device may include visual and/or audio and/or tactile feedback devices configured to provide an indication of a successful or failed exchange of tags, the number of tags exchanged or to indicate that an exchange of tags has previously been performed between the two devices.

A successful data exchange results in the data payload created by the transmitting device being copied into the receiving device, and an acknowledgement returned, completing the transaction. The data payload as explained above contains a 128-bit cryptographically-secure pseudo-random number, one exchanged in each direction. Both devices commit the received data payload to their respective flash memories.

Data exchange may include extra transactions to provide immunity from interference, frequency agility, synchronisation, differentiation between other nearby devices, and to overcome collisions when two devices switch to transmit simultaneously.

The device will continue to accumulate these tags, one for each time the device successfully completes a data-exchange with another device, each being a record of an event where two or more users have completed the necessary actions to record their desire to exchange user related information via the associated software systems.

When the device is connected to a computer, via the device's USB connector, the stored tags are passed from the device to a remote server, and the computer's web browser is also directed to the server. The user is able to create an account, or re-use an existing account on the server, which is then accessible by way of a web browser. The tags are stored on the server, along with the user's personal details, or may be cached for immediate or later association with a user.

The server will also search for matches between the tags uploaded by the user, and any other tags on the server. Where matches are found, the identity of the other matching party may be displayed in the web browser. If both parties to a match give, or have given, authorisation such personal details as they authorise are shared with the other party, either through a web browser or directly to a mobile phone via a messaging service or smartphone application. That is, the user is able to select options about which parts of their user related information are shared with which parties. Further, each user is able to select an option to share all information without further user intervention. Further, each user is able to privately reconsider what information is shared at some time after use of the device by not enabling automatic sharing of data, and then selecting which data is to be shared after the tags have been exchanged.

The exchange of unique (or near unique) tags enables a user of the electronic data sharing device to share user related data with a further user of a functionally similar electronic data sharing device without requiring the user or the further user to a) configure either the electronic data sharing device or further electronic data sharing device, b) input data into either the electronic data sharing device or the further electronic data sharing device or c) provide data to either the electronic data sharing device or the further electronic data sharing device prior to activation of the data exchange initiation device or the further electronic data sharing device.

The electronic data sharing device may also include functionality for detecting a similar data sharing device within the vicinity.

That is, the electronic data sharing device may be equipped with a continuously or intermittently enabled, direct device-to-device radio communication module. This data sharing device may, whilst carried on the person, come within radio communication range of a similar device from time to time. It would be considered useful if such devices are able to signal each other and/or additionally alert their users, that there are similar devices nearby.

One issue involved with continuous attempts at connection is the power consumption of the device. According to this system a low duty-cycle is used to apply power to the transmitter and another low duty-cycle is used to apply power to the receiver. In this manner, power consumption can be limited to a level compatible with having a small overall impact on battery power usage, whilst having no excessively detrimental impact on the time to detect, or the reliability of detecting, nearby devices.

The following description provides more details on how the devices in close proximity to each other may detect and communicate with each other.

If the transmitter Tx is powered-up for a time=t, and then powered-down for a time=(n−1)·t, then the total duty-cycle is considered to be $$[(n-1) \cdot t] + t = n \cdot t$$

If the receiver Rx is powered-up for a time=t, and then powered-down for a time=(m−1)·t, then the total duty-cycle is considered to be $$[(m-1) \cdot t] + t = m \cdot t$$

If n and m are prime numbers, then, within n·m time periods of duration t, the transmitter of one device being enabled will coincide with the receiver of any other device being enabled. Further, as an alternative, the system may also operate successfully where n and m are co-prime.

In FIG. 8 the situation where n and m are prime numbers is shown as an example for values of 7 and 5 for n and m respectively, with waveforms for every possible position of n. It is to be noted that the dots indicate where each waveform for n comes into sync with m. It will be understood that these values of n and m are impractically small and shown for illustration purposes only.

However, if, for example, n=101, and m=103, and t=3 ms, then within (101) (103) (3)=31209 ms, or approximately 30 seconds, one device will have detected the other provided that the transmitter continuously signals throughout the transmit time window, and the receiver is ready to receive throughout the receive time window. It will be understood that, in practice, as both devices are cycling through both receive and transmit modes the actual time is likely to be reduced.

Also in practice it will be found that when any 2 duty cycles result in a simultaneous transmission from one device whilst another is receiving, the time-overlap is likely to be partial and less than time t (see FIG. 8, lower). At worst case this will be t/2, a 50% overlap (as a 49% overlap in one cycle would result in a 51% overlap in another). The duration of t/2 may therefore be chosen such that it is always sufficient to complete a data-exchange.

If all similar devices use the same pair of prime numbers for the duty cycle of their transmitters and receivers, then it will be found that the duty cycle of every transmitter and every receiver within range will coincide within the mathematical product of the two duty cycles. Careful selection of the values of n, m and t will ensure both that nearby devices are always detected in an acceptable time scale and that power consumption is minimised. Further careful selection of the time period for selecting new values for the identification tag of the device will ensure that privacy is maintained, whilst ensuring that excessive repeated detection of the same nearby device does not occur.

This process of the user exchanging data with another user of a similar device is carried out at the lowest-possible radio-frequency power level that reliably results in a successful data-exchange.

When devices are not engaged in user-initiated data-exchanges, they will continuously search for other nearby devices. This is done on a different radio-frequency, and at a suitable, higher power-level to give reasonable detection at the range required (typically <3 m).

Each device uses its AES hardware as a cryptographically-secure pseudo-random number generator (CSPRNG), and by taking only the 4 least-significant bits uses these as device temporary non-unique identification (DTNUID). A counter is used to expire the DTNUID after 10 minutes, and generate a new one.

The DTNUID is used as the payload in repeated automatic transmission over a 3 ms period, once in 303 ms duty cycle. Each device also enables its receiver for 3 ms once in a 309 ms duty cycle. It will be understood that alternative duty cycle timings may be used.

Where one device's transmit coincides with another device's receive, and a successful transmission takes place, the DTNUID of the transmitter is exchanged with the receiver, and the receiver's DTNUID returned in the acknowledgement. Each device then makes a check to see if this particular DTNUID has been seen before and if not, the user is alerted through the visual and/or audio interface.

In this way, devices previously detected do not excessively re-trigger user alerts but do remind the user again after the expiry of any DTNUID.

Along with the DTNUID, a timestamp may be passed between devices and this timestamp used to help establish a common time reference for synchronization purposes. For example, an algorithm may be included that takes an average between the timestamp values exchanged, or takes the maximum or minimum values of the timestamp.

Power consumption based upon a duty-cycle of 1/101 and 1/103 is approximately 2%. It has been estimated that the radio components suitable for use with the device use approximately 18.5 mA during transmit or receive (mutually exclusive), corresponding to an average current of 0.37 mA. Based upon a 200 mAh battery only doing background searches, this corresponds to a battery life of 540 hours.

The proposed solution requires no active participation of the user, beyond having the device in their possession as they go about their normal business.

Such communications may be transmitted within a single radio communications packet, or preset sequence of packets, so no layered communications protocol is necessary. Data exchange may include extra transactions to provide immunity from interference, frequency agility, and synchronisation. Further, where sufficient space exists in the radio communications packet, other useful information may be communicated, such as synchronisation information, or information that, when combined with software algorithms in the device, is useful in estimating the number of nearby devices. Alternatively, device to device communication may be initiated for the purpose of carrying messages defined by the user or providing timed, externally triggered or co-ordinated visual, audible or tactile effects for the purposes of entertaining an assembled group of users, as described herein.

As a further alternative, if data protection laws and protocols allow and in relation to specialised areas of application, the auto detection capabilities as described above may be used in conjunction with the tag exchanging methods herein described. That is, the device herein described may be modified to not only detect a similar device without user interaction as described herein but to also subsequently exchange a tag with a detected device after detecting the similar device and without user interaction.

Therefore, tags may be exchanged by two or more devices without the relevant parties knowing who they are exchanging with. The device may be configured to alert the user when exchanging tags. The alert may be discrete such as a brief vibration, or may be less discrete though the output of an alert signal such as a beep or siren. The user may then find out later more details concerning the relevant sharing party when they plug the device into a PC.

Second Embodiment

According to this second embodiment, an alternative system of transferring data from an electronic data sharing device to a server is provided.

As an alternative to transferring data from an electronic data sharing device via an internet-connected personal computing device, a wireless synchronisation device may be used. The wireless synchronisation device may transfer the tags to the server automatically when the wireless synchronisation device and electronic data sharing device are able to communicate with each other. This enables data to be transferred to the server without requiring any additional action on the part of the electronic data sharing device users.

Electronic data sharing devices are used in the same way as described above to initiate an exchange of tags. For example, by tapping one device against another an exchange of tags by radio is triggered.

After an electronic data sharing device has received a new tag, it then has unsynchronised data in its flash memory.

As a consequence of having this unsynchronised data, the electronic data sharing device switches to a communications receive mode, and starts listening for transmissions from an instant-sync point. The electronic data sharing device does this for a limited time duration and on a low duty cycle for power-conservation reasons.

The instant-sync point transmits a designated special-purpose tag indicating that the instant-sync point wishes to receive unsynchronised tags from any electronic data sharing device ready to transmit them.

An electronic data sharing device receiving this special purpose tag responds with an indication that it has unsynchronised data, and the instant-sync point then initiates the transfer of this data from the electronic data sharing device to the instant-sync point.

As data is transferred to the instant-sync point from the electronic data sharing device, the instant-sync point also transfers this data to a connected PC by a serial communication means over USB. The connected PC on completion of the transfer of all data to be synchronised, then uploads this data to the server.

After data has been transferred, the instant-sync point sends a special-purpose tag to the electronic data sharing device indicating that the data has been successfully synchronised with the server. The electronic data sharing device then marks its data as synchronised, turns off its receiver, and moves to a power conserving state.

The data on the server may then be matched as described in the first embodiment to enable users to share user related information. The server may automatically send the user related information to a user's personal computing device or mobile telephone to enable them to immediately access the user related information and obtain contact details etc of the person they have just exchanged tags with.

This therefore provides a capability to allow users to immediately access exchanged contact information through other devices, such as their tablets and mobile telephones for example.

Where a user lacks immediate access to a PC, they often still have access to their mobile phone. If the registration procedure of users includes their mobile phone number, then contact information collected may immediately be pushed to almost any suitable device, for example in the vCard format. This approach therefore avoids common difficulties of compatibility associated with the wide variety of phone manufacturers and models.

Further, in certain circumstances it will be understood that organisers of an event where the electronic data sharing devices are being used may provide a wireless synchronisation point in a specific area to enable users to automatically transfer their collected tags. For example, one or more wireless synchronisation points may be provided at an exit point to ensure that all tags are transferred automatically as users leave the area.

Third Embodiment

According to this third embodiment, a further alternative system of transferring data from an electronic data sharing device to a server is provided.

According to the first embodiment above, electronic data sharing devices are able to communicate with their peers in order to exchange tags. The electronic data sharing devices then record these tags to flash memory. The tags are then uploaded from flash memory via a USB interface to a server.

In order to make this uploading to the server more frequent and easier for the user, a special-purpose tap-point may be provided to enable the user to send their collected tags without requiring the need to connect their electronic data sharing device to a personal computing device.

This tap point always initiates a data exchange with the electronic data sharing using a designated special-purpose tag indicating that the exchange will be a download of stored tags from the electronic data sharing device, rather than the normal exchange of tags.

The tap point incorporates standard device electronics as described above in the first embodiment, but with the outer appearance of a public terminal. That is, the tap point will be clearly marked in an area to enable users to identify the tap point device.

The tap point contains a version of the device firmware that supports serial over USB communication protocols so that the received stream of tags transferred from the electronic data sharing device is immediately transmitted over a wired interface to a connected PC. The PC then transmits the received tags to the server, in the same manner as if the electronic data sharing device providing the download had been directly connected to the PC.

As described above in the second embodiment, this therefore provides a capability to allow users to immediately access exchanged contact information through other devices, such as their tablets and mobile telephones for example.

Further Embodiments

It will be understood that the embodiments of the present invention described herein are by way of example only, and that various changes and modifications may be made without departing from the scope of invention.

It will be understood that, where the users of the herein described electronic data sharing device are also users of smart phones, specially written smartphone applications or programs may enable users to configure their own personal account details, associate computing devices with this account and view the personal contacts that they have made using the electronic data sharing device.

Unlike PC's where a USB port is ubiquitous, some phone models have USB and some do not. Of those that do, some are USB master and slave, and some are slave only.

However, all the herein described operations may be performed through a specially written application or program without a requirement for a USB connection, provided that data from the electronic data sharing device has been synchronised by a route not requiring a USB connection to the electronic data sharing device.

Association of electronic data sharing devices with a particular personal account can be done through any of manually entering a code printed on the electronic data sharing device, reading an optical barcode with a phone's built-in camera, or where available the device's communications protocol can be switched from the propriety protocol used to exchange tags to a Bluetooth protocol (e.g. Bluetooth LE) in order for the electronic data sharing device to communicate wirelessly directly to the phone.

Further, it will be understood that the electronic data sharing device may incorporate functionality to provide visual effects, for example with application to large assembled groups of device users.

The electronic data sharing device may possess a short-range radio, with a range of approximately 10 m, such that several other users are extremely likely to be within range of any particular electronic data sharing device in the possession of a member of an audience at a social event.

This capability, combined with the automated process of communication already described, provides a suitable environment for devices to act autonomously yet provide visual effects that appear to require overall external control.

An algorithm is stored within the memory of the electronic data sharing device to configure the electronic data sharing device to operate in a specific way and provide visual effects.

For example, the algorithms may be based on simple behavioural rules as follows to switch the LEDs on or off the electronic data sharing devices. One such example is:
i) Any illuminated device with fewer than two illuminated neighbours turns off.
ii) Any illuminated device with 2 or 3 illuminated neighbours continues in that state.
iii) Any illuminated device with more than 3 illuminated neighbours turns off.
iv) Any non-illuminated cell with exactly 3 illuminated neighbours becomes an illuminated device.

The electronic data sharing devices may modify their behaviour in regular time steps (for example, in one second intervals) such that evolving patterns are observed by an observer.

It will be understood that sounds may also be generated using any suitable audio device on the electronic data sharing device.

It will be understood that this is one specific example of an autonomous-device rule-based behaviour, and that many variations are possible by changing one or more of the steps above, or by including or removing steps.

Other cellular behaviours suited to the herein described electronic data sharing device may be enabled through the use of fractal mathematics such as Mandlebrot sets and Julia sets to provide visually pleasing effects in large assembled groups of individuals in possession of these electronic data sharing devices.

Further, a small number of electronic data sharing devices may be under the active control of event organisers to initiate the above described visual behaviour. These "seed" devices may be under the personal control of individual event staff, or automatically triggered through audio or stage-lighting control systems, for example. Therefore, the electronic data sharing devices may respond automatically and as a group simultaneously to a timed event, an external radio stimulus or other trigger, to provide visual and/or audible effects for entertainment purposes.

Further, It will be understood that the electronic data sharing device may include video, audio, ambient light, temperature, air pressure, acceleration, global positioning, base-station triangulation and similar sensors.

Further, it will be understood that the electronic data sharing device may further include video, audio, haptic and similar transducers.

Further, it will be understood that alternative embodiments of the device enable the devices to share tags and/or data by use of physical electrical contacts, such that the electronic data sharing devices must physically come into contact with each other to exchange a tag.

Further, it will be understood that the data exchange initiation device suitable to detect the initiation of a data exchange request may be a button, touch sensitive pad, optical sensor, near field sensor, Hall Effect device, accelerometer, vibration sensor or other proximity sensor or a combination of these.

Further, it will be understood that any other suitable wireless communication protocol other than 2.4 GHz radio may be used to transmit tags, such as Bluetooth, Infra Red etc. Further, it will be understood that any suitable optical transmission protocol may be used.

Further, it will be understood that the tag generation module may include one or more of an incremental counter, random number generator; pseudo-random number generator, cryptographic hash generator, block cipher unit, or cryptographically-secure pseudo-random number generator to generate the tags.

Further, it will be understood that the user related configuration or data entry may include one or more of: the entry of any user related data on the device; user configuration of the device; user registration of the device; user registration of the service.

Further, it will be understood that the electronic data sharing device may have one or more user input devices, and the data exchange initiation device may be activated by an input signal received from the one or more input devices. For example, the one or more input devices may be one or more of a user operated button, switch or touch sensor. Further, the tag generation module may be configured to associate the generated unique tags with a predetermined property based on the activation of the one or more user input devices. For example, the predetermined property may be one or more of: a level of importance, a level of significance, a level of security, a level of friendship, a hierarchical level of business association.

Various embodiments described herein therefore provide a data synchronisation method using an electronic data sharing device, where some or all of the stored tags are transmitted in response to either a user initiated interaction with a fixed or mobile terminal, or some or all stored tags are transmitted in response to being polled by a fixed or mobile system providing synchronisation without a requirement for user initiation.

The invention claimed is:

1. An electronic data sharing device for sharing user related information with users of other functionally similar electronic data sharing devices, the electronic data sharing device comprising:
    a processor configured to generate a temporary, characteristically non-unique, identification tag to identify the electronic data sharing device, and to generate it from a small subset of least significant bits of a random number, making the identification tag characteristically non-unique in comparison to a tag generated from a large set of bits of a random number;
    a transmitter configured to transmit from the electronic data sharing device the generated identification tag via a wireless medium; and
    a receiver configured to receive at the electronic data sharing device a further identification tag generated by a further electronic data sharing device;
    wherein the processor is configured to generate an alert on the electronic data sharing device when the transmission and reception of the identification tags is successful, to indicate that the further electronic data sharing device is in the vicinity.

2. The electronic data sharing device of claim 1 further configured to:
    operate, via the transmitter, in a transmit mode, wherein the device is configured to transmit the generated identification tag for a first pre-determined duration within a first pre-determined period; and
    operate, via the receiver, in a receive mode, wherein the device is configured to receive a further temporary, non-unique, identification tag generated by another electronic data sharing device for a second pre-determined duration within a second predetermined period.

3. The electronic data sharing device of claim 1, wherein the electronic data sharing device or further electronic data sharing device is a personal portable electronic device and/or wherein the electronic data sharing device or further electronic data sharing device is a static or mobile electronic device offering a public service or used for a purpose other than as a personal device.

4. The electronic data sharing device of claim 1, wherein:
    the device is configured to operate, via the transmitter, in transmit mode using a first pre-determined period that is based on the relationship $m \times t1$, and operate, via the receiver, in receive mode using a second predetermined period that is based on the relationship $n \times t2$, where $t1$ and $t2$ are first and second pre-determined durations, and $n$ and $m$ either have a co-prime relationship or optionally are both prime numbers, wherein $t1$ and $t2$ are the same time periods or different time periods; or
    the device is further configured to share, via the transmitter and receiver, data or computer instructions in order to provide timed, externally triggered or co-ordinated visual, audio or tactile effects for the purposes of providing entertainment to a group of assembled users of the device.

5. The electronic data sharing device of claim 1, wherein the device is configured:
    (a) in receive mode to read the identification tag generated by the other electronic data sharing device within a time equal to not more than half a first pre-determined duration;
    (b) to determine if the received further identification tag has previously been received, and upon a negative determination, generate the alert;
    (c) to determine if the received further identification tag has previously been received, and upon a positive determination, not generate the alert;
    (d) to generate the identification tag based upon a number that has been internally generated for the purposes of encrypting data; or
    (e) to generate a time stamp, and when in transmit mode, transmit the time stamp.

6. The electronic data sharing device of claim 1, wherein the device is configured:
    (a) when operating in receive mode to receive a time stamp generated by another electronic data sharing device, and establish a common time reference with the other electronic data sharing device;
    (b) to generate an audible, tactile of visual feedback as the alert; and
    (c) to generate a new identification tag after a predetermined time interval to provide increased security to the user of the electronic data sharing device, such as wherein the predetermined time interval is related to the time period of an event which the user is attending, is determined by the user, or is fixed in the device.

7. The electronic data sharing device of claim 1, further comprising a memory, wherein the processor is further configured to:
    (a) generate and store into the memory statistical information based on the number of other electronic data sharing devices in the vicinity, information on user activity or other statistical information;
    (b) generate one or more first corresponding portions of data based on a unique identification code that is associated with the electronic data sharing device and a pre-defined code generating algorithm, exchange one or more generated first corresponding portions of data with one or more second corresponding portions of data that were generated on one or more further electronic data sharing devices, store the received second corresponding portions of data, discard the sent first corresponding portions of data, and transmit the second corresponding portions of data and the unique identification code to a server to enable the server to match each first and second corresponding portions of data.

8. A method of data sharing using an electronic data sharing device for
sharing user related information with users of other functionally similar electronic data sharing devices, the method comprising the steps of:
generating a temporary, characteristically non-unique, identification tag to identify the electronic data sharing device, and generating it from a small subset of least significant bits of a random number, making the identification tag characteristically non-unique in comparison to a tag generated from a large set of bits of a random number;
transmitting from the electronic data sharing device the generated identification tag via a wireless medium;
receiving at the electronic data sharing device a further identification tag generated by a further electronic data sharing device; and
generating an alert on the electronic data sharing device when the transmission and reception of the identification tags coincide to indicate that the further electronic data sharing device is in the vicinity.

9. The method of claim 8 further comprising:
(a) operate in a transmit mode by transmitting the generated identification tag for a first pre-determined duration within a first pre-determined period, and operating in a receive mode by receiving a further temporary, non-unique, identification tag generated by another electronic data sharing device for a second pre-determined duration within a second pre-determined period;
(b) operating the device in transmit mode using a first pre-determined period that is based on the relationship m×t1, and operating in receive mode using a second pre-determined period that is based on the relationship n×t2, where t1 and t2 are first and second pre-determined durations, and n and m have a co-prime relationship or are both prime numbers, preferably wherein t1 and t2 are the same time periods or different time periods;
(c) reading the identification tag generated by the other electronic data sharing device within a time equal to not more than half the first pre-determined duration;
(d) determining if the received further identification tag has previously been received, and upon a negative determination, generating the alert or upon a positive determination, not generating the alert;

(e) generating the identification tag based upon a number that has been internally generated for the purposes of encrypting data; and/or
(f) generating a time stamp, and when in transmit mode, transmitting the time stamp.

10. The method of claim 9, wherein the, or further, electronic data sharing device is a personal portable electronic device or static or mobile electronic device offering a public service or used for a purpose other than as a personal device.

11. The method of claim 8 further comprising:
(a) receiving a time stamp generated by another electronic data sharing device when in receive mode, and establishing a common time reference with the other electronic data sharing device;
(b) generating an audible, tactile of visual feedback as the alert;
(c) generating a new identification tag after a predetermined time interval to provide increased security to the user of the electronic data sharing device, wherein the predetermined time interval is related to the time period of an event which the user is attending, is determined by the user or is fixed in the device.

12. The method of claim 8 further comprising storing statistical information based on the number of other electronic data sharing devices in the vicinity, information on user activity or other statistical information.

13. The method of claim 8 further comprising:
generating one or more first corresponding portions of data based on a unique identification code that is associated with the electronic data sharing device and a pre-defined code generating algorithm, exchanging one or more generated first corresponding portions of data with one or more second corresponding portions of data that were generated on one or more further electronic data sharing devices, storing the received second corresponding portions of data, discarding the sent first corresponding portions of data, and transmitting the second corresponding portions of data and the unique identification code to a server to enable the server to match each first and second corresponding portions of data.

14. The method of claim 8 further comprising:
sharing data or computer instructions in order to provide timed, externally triggered or co-ordinated visual, audio or tactile effects for the purposes of providing entertainment to a group of assembled users of the device.

* * * * *